(12) United States Patent
Hu (10) Patent No.: US 9,172,775 B2
(45) Date of Patent: Oct. 27, 2015

(54) NETWORK COMMUNICATION SYSTEM, DEVICE, AND METHOD FOR REDUCING A NETWORK ADDRESSING HEADER

(71) Applicant: HON HAI PRECISION INDUSTRY CO., LTD., New Taipei (TW)

(72) Inventor: Jyh-Ding Hu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 96 days.

(21) Appl. No.: 13/972,923

(22) Filed: Aug. 22, 2013

(65) Prior Publication Data
US 2014/0056301 A1 Feb. 27, 2014

(30) Foreign Application Priority Data

Aug. 22, 2012 (TW) .............................. 101130550 A (51) Int. Cl.
*H04L 29/06* (2006.01)
(52) U.S. Cl.
CPC ...................................... *H04L 69/22* (2013.01)
(58) Field of Classification Search
None
See application file for complete search history.

(56) References Cited

U.S. PATENT DOCUMENTS

| | | | |
|---|---|---|---|
| 2004/0090966 A1* | 5/2004 | Thomas | 370/395.52 |
| 2011/0310898 A1* | 12/2011 | Alkhatib | 370/392 |
| 2013/0010614 A1* | 1/2013 | Lin et al. | 370/250 |
| 2013/0097336 A1* | 4/2013 | Lu et al. | 709/245 |
| 2013/0235871 A1* | 9/2013 | Brzozowski et al. | 370/392 |

FOREIGN PATENT DOCUMENTS

| CN | 101645823 A | 2/2010 |
|---|---|---|
| CN | 101779421 A | 7/2010 |

OTHER PUBLICATIONS

Mun, Lee. Understanding IPv6. Springer. 2005. ISBN 0-387-25429-3. pp. 178-187.*

* cited by examiner

*Primary Examiner* — Jeffrey M Rutkowski
*Assistant Examiner* — Andre Tacdiran
(74) *Attorney, Agent, or Firm* — Novak Druce Connolly Bove + Quigg LLP (57) ABSTRACT

A method for reducing a network addressing header is executable by a network communication device. Upon receiving a network packet, a first address in an IPv4 header of the packet is converted to a mapping index. A least significant segment of an address field of an IPv6 header of the packet is generated based on the mapping index, and the IPv6 header is utilized to encapsulate the packet. The IPv4 header is recoverable via the least significant segment of the IPv6 header, so that the IPv4 header may be optionally omitted in transmission of the packet.

19 Claims, 8 Drawing Sheets

NETWORK COMMUNICATION SYSTEM, DEVICE, AND METHOD FOR REDUCING A NETWORK ADDRESSING HEADER

BACKGROUND

1. Technical Field

Embodiments of the present disclosure relate to electronic network communication systems and devices, and to a method for reducing a network addressing header.

2. Description of Related Art

Internet protocol version 4 (IPv4) has long been used as the Internet addressing standard. The number of IPv4 addresses, while vast, is finite, and address exhaustion is an emerging problem. Internet protocol version 6 (IPv6) was developed to solve address depletion associated with IPv4-based Internet use, and has features such as an expanded 128-bit address system, a simplified header structure, improved quality of service (QoS), and enhanced security.

However, long packet addressing headers degrade the processing speed of routers and nodes that process Internet traffic, thereby slowing down the overall performance of the Internet. In particular, multimedia traffic, such as voice over Internet protocol (VoIP) traffic or video conference traffic, is significantly affected by transmission delay or jitter of the network.

In reality, the current Internet cannot be rapidly converted into an IPv6 network since the IPv4 network is widely used. The IPv4 network and the IPv6 network will coexist for the time being while the IPv4 network is gradually replaced by the IPv6 network.

Coexistence of IPv6 hosts/routers and IPv4 hosts/routers in an IPv4/IPv6 combination network induce coexistence of IPv4 and IPv6 addressing headers during packet transmission, such as in an IPv4 over IPv6 context or an IPv6 over IPv4 context. Coexistence of IPv4 and IPv6 addressing headers slows down addressing header processing.

DETAILED DESCRIPTION

The disclosure is illustrated by way of example and not by way of limitation in the accompanying drawings, in which like reference numerals indicate similar elements. Various embodiments illustrate different features of the disclosure. It should be noted that references to "an" or "one" embodiment in this disclosure are not necessarily to the same embodiment, and such references can mean "at least one." The descriptions of components in the embodiments are given for the purpose of illustrating rather than limiting.

Embodiments of a network communication system and device, and a method for reducing a network addressing header, are detailed in the following description.

The disclosed network communication systems and network communication devices for reducing a network addressing header may be implemented as stand-alone systems or devices, or may be integrated into various network gateway devices or network terminal devices. The various network gateway devices comprise bridges, routers, switches, hot spots, and access points for wireless networking. The various network terminal devices comprise set-top boxes, cell phones, tablet personal computers, laptop computers, multimedia players, digital cameras, personal digital assistants (PDAs), navigation devices, and mobile internet devices (MIDs).

Figure 1:
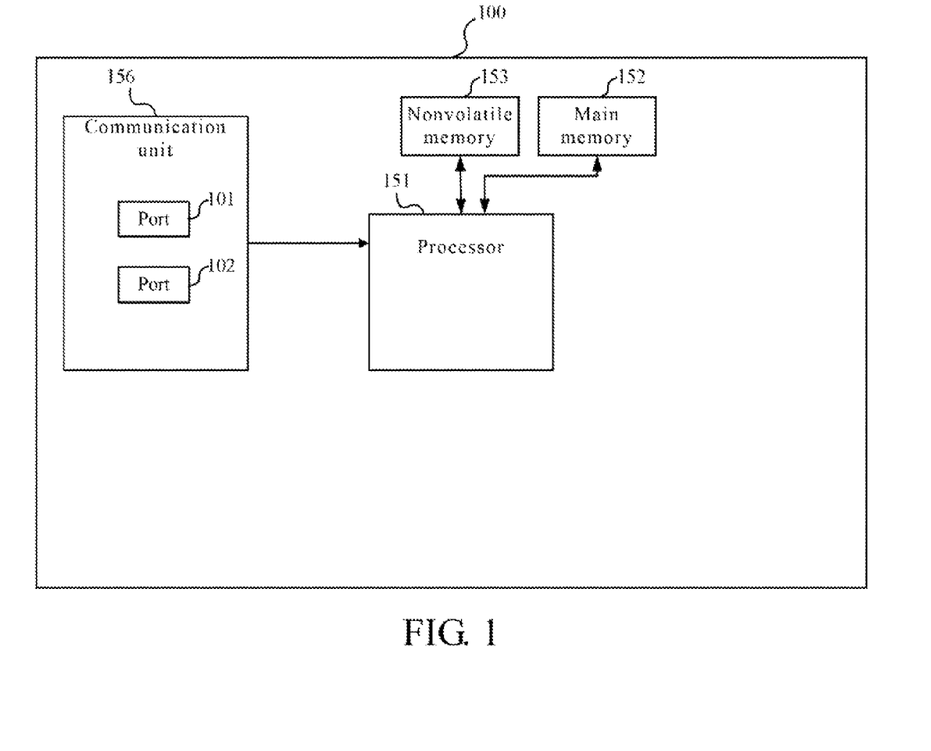
FIG. 1 is a block diagram of one embodiment of an electronic network communication device for reducing a network addressing header, in accordance with the present disclosure.

With reference to FIG. 1, a processor 151 serves as a central processing unit (CPU) of a network communication device 100, and may comprise various integrated circuits (ICs) operable to process data and execute machine-readable instructions. The connections between the components of the network communication device 100 may comprise serial or parallel connections of wired or wireless communication.

A communication unit 156 establishes wired or wireless communication channels through which the network communication device 100 connects to and performs communication with remote and local servers, such as packetized data communication. For example, the communication unit 156 connects to a remote server (not shown) through a port 102 and a wide area network, and connects to a local server (not shown) through a port 101 and a local area network.

For example, the communication unit 156 establishes a wired network communication channel to the Internet or the remote server. The communication unit 156 comprises software and hardware components utilized for the wired network communication channel. The software components comprise computerized programs or instructions, while the hardware components comprise electronic circuits, ICs, and physical ports and connectors.

For example, the communication unit 156 establishes a wireless communication channel through which a portable device (not shown), such as a network terminal device, may connect to and exchange data with the network communication device 100. The communication unit 156 establishes a wireless communication channel to the Internet or a server in the Internet. The communication unit 156 comprises antennas, and base band and radio frequency (RF) chipsets, all of which are for infrared communication, wireless local area network communication, and/or cellular communication, such as wideband code division multiple access (W-CDMA) and high speed downlink packet access (HSDPA). Through the established wireless communication channels, the network communication device 100 serves as a wireless LAN access point through which the portable device connects to the Internet.

The processor 151 may be packaged as one chip, or comprise a plurality of chips of identical function or different functions, interconnected through buses. The plurality of chips may be also packaged as one chip. For example, the processor 151 may only comprise a central processing unit (CPU); or may comprise a combination of a CPU, a digital signal processor (DSP) and a chip of a communication controller, such as a chip of the communication unit 156. The communication controller may comprise a controller of Ethernet, cellular, infrared, Bluetooth or wireless local area network (WLAN) communication devices. The CPU may comprise one or more computing cores. The communication controller may support direct memory access (DMA), and coordinate communication among components of the network communication device 100 or communication between the network communication device 100 and external devices.

Nonvolatile memory 153 stores an operating system and applications executable by the processor 151. The processor 151 loads runtime processes and data from the nonvolatile memory 153 to a main memory 152. The main memory 152 may comprise a random access memory (RAM), such as static RAM (SRAM) or dynamic RAM (DRAM). The nonvolatile memory 153 may comprise an electrically erasable programmable read-only memory (EEPROM) or a flash memory, such as an NOR flash or an NAND flash.

Figure 2:
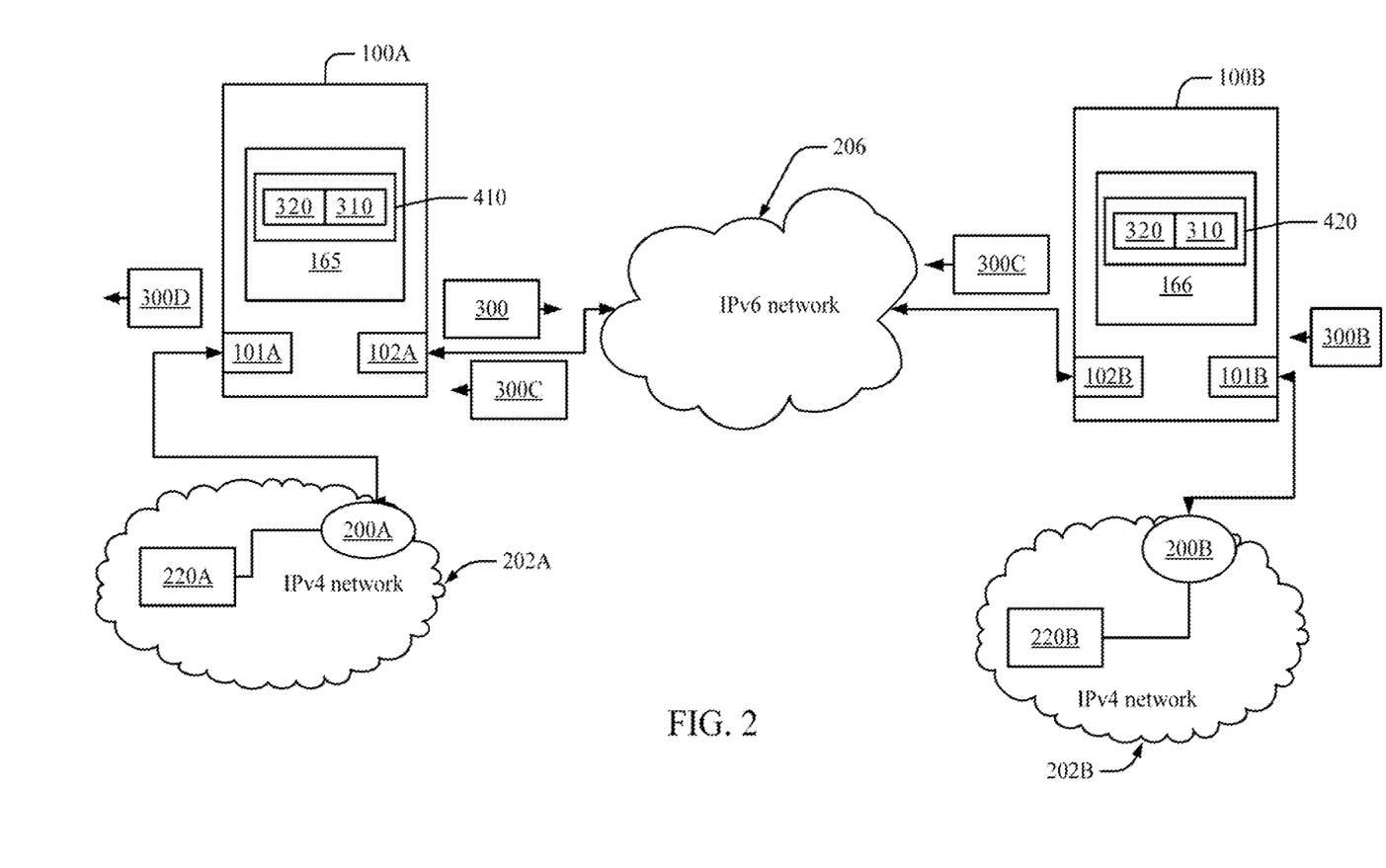
FIG. 2 is a schematic diagram of one embodiment of a network system for reducing a network addressing header, in accordance with the present disclosure.

FIG. 2 shows a network system for reducing a network addressing header. Network devices 100A and 100B are respectively two embodiments of the network communication device 100. The network device 100A maintains a database 165, and the network device 100B maintains a database 166. The network device 100A connects to an IPv6 network 206 through a port 102A, and the network device 100B connects to the IPv6 network 206 through a port 102B.

The network device 100A connects to a network gateway device 200A in an IPv4 network 202A through a port 101A. The network gateway device 200A is connected to a network terminal device 220A. The network device 100B connects to a network gateway device 200B in an IPv4 network 202B through a port 101B. The network gateway device 200B is connected to a network terminal device 220B. The network device 100A connects to an IPv6 network, such as the network 206, through a port 102A. The network device 100B connects to an IPv6 network, such as the network 206, through a port 102B. Referring to FIGS. 1 and 2 together, the network communication device 100 connects to an IPv4 network, such as the network 202A or 202B, through the port 101, and connects to an IPv6 network, such as the network 206, through the port 102. The ports 101A and 101B of the network devices 100A and 100B are examples of the port 101 of the network communication device 100. The ports 102A and 102B of the network devices 100A and 100B are examples of the port 102 of the network communication device 100.

Figure 3:
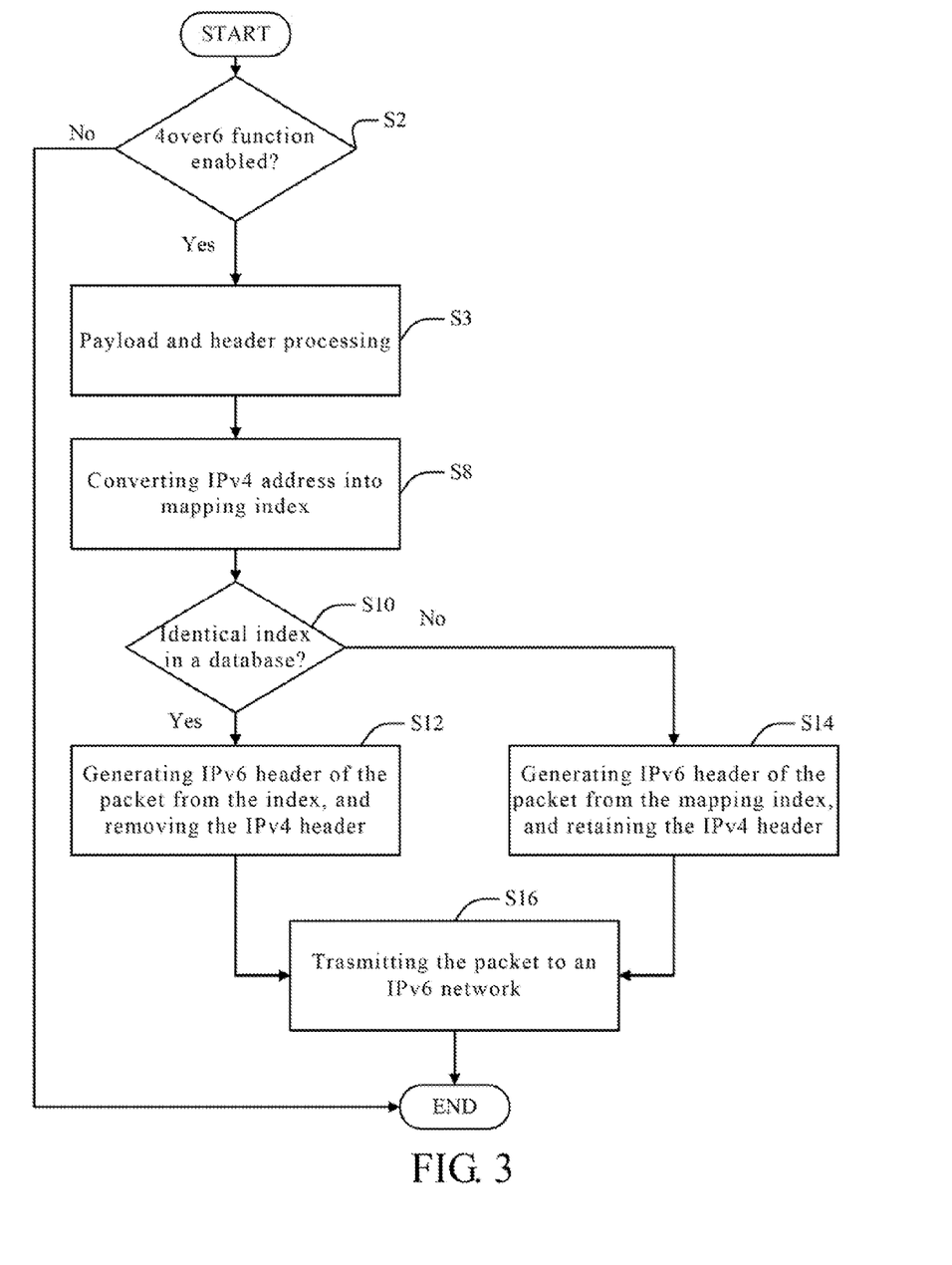
FIG. 3 is a flowchart of one embodiment of a method for reducing a network addressing header, in accordance with the present disclosure.

With reference to FIG. 3, the network communication device 100 executes a method for reducing a network addressing header to transfer network packets. The network device 100A of FIG. 2 is given as an example of the network communication device 100 in the following description. The processor 151 of the network communication device 100 executes the steps in the following order.

The processor 151 receives a first packet 300 in a communication originating from a source device and addressed to a recipient device, and determines whether a 4over6 function is enabled (step S2). The communication may comprise a session, such as a session carrying VoIP packets, media streaming packets, or others. The source device may comprise the network communication device 100 or another device connected with the network communication device 100. In the example of the network device 100A in FIG. 2, the processor 151 receives the first packet 300 through the port 101A. The first packet 300 may for example be transmitted along a communication path from either the network gateway device 200A or the network terminal device 220A to either the network gateway device 200B or the network terminal device 220B, and in each case the communication path is via both the network devices 100A and 100B. Thus, the communication transferring the first packet 300 is carried out across a first network of a first addressing scheme of IPv4 and a second network of a second addressing scheme of IPv6.

The 4over6 function is a function of establishing a channel in an IPv6 network to allow IPv4 packets to pass. If the 4over6 function is not enabled, the process of the method is terminated. If the 4over6 function is enabled, step S3 is executed. The processor 151 in step S3 processes payloads and addressing headers of the packets. For example, as a voice over Internet protocol (VoIP) gateway connected with a telephone, the network communication device 100 in step S3 converts audio signals from the telephone to generate real-time transport protocol (RTP) packets as the payloads, and generates IPv4 addressing headers of the RTP packets.

Figure 4:
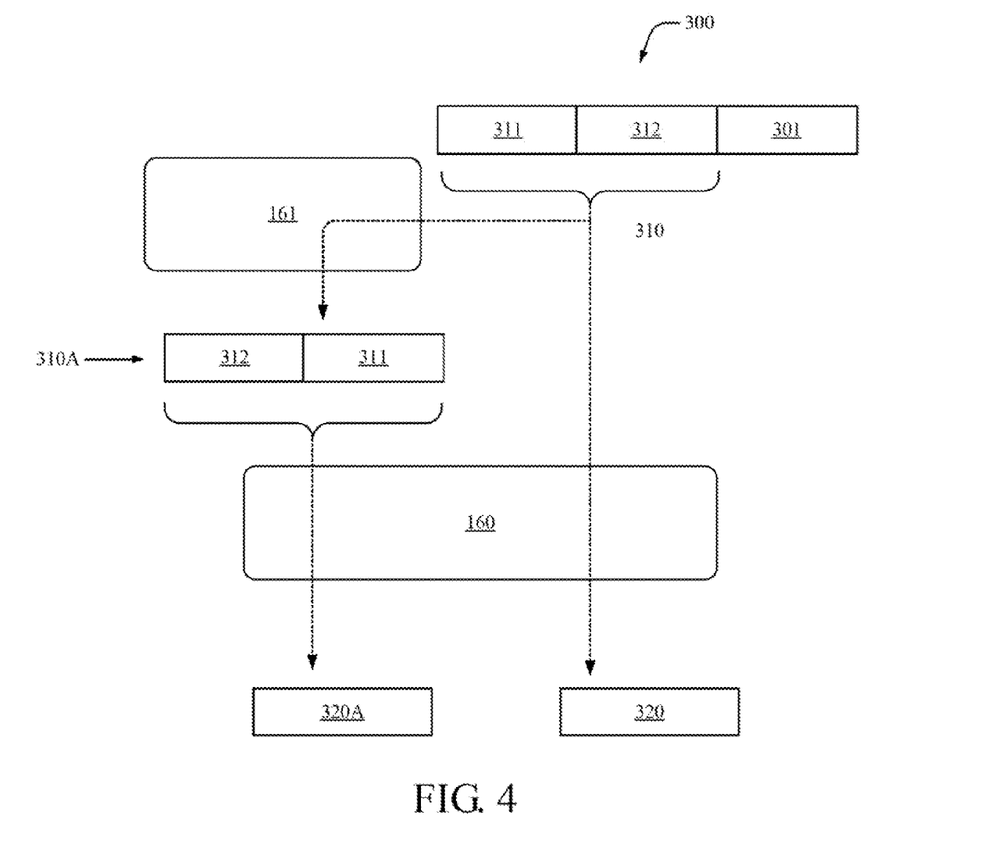
FIG. 4 is a schematic view of a packet with an IPv4 addressing header utilized to generate a mapping index and a counter index, in accordance with the present disclosure.

As shown in FIG. 4, if the first packet 300 comprises a payload 301, and an IPv4 addressing header 310 representing a first IPv4 address, the processor 151 retrieves the first packet 300 and utilizes a converter 160 to convert the first IPv4 address into a mapping index 320 before transmitting the first packet 300 to the IPv6 network 206 (step S8). The converter 160 may comprise a machine-readable program which performs the conversion. The converter 160 may be stored in the main memory 152 or the nonvolatile memory 153. The first IPv4 address comprises a source IPv4 address 311 and a destination IPv4 address 312, as shown in FIG. 4. For example, the mapping index 320 is a 32-bit binary number. Embodiments of the converter 160 comprise a hash function that converts the first IPv4 address of the first packet 300 into the mapping index 320. Although the mapping index 320 is generated from the IPv4 header 310 of the first packet 300, the converter 160 in an alternative embodiment may generate the mapping index 320 from a user datagram protocol (UDP) header.

Figure 5:
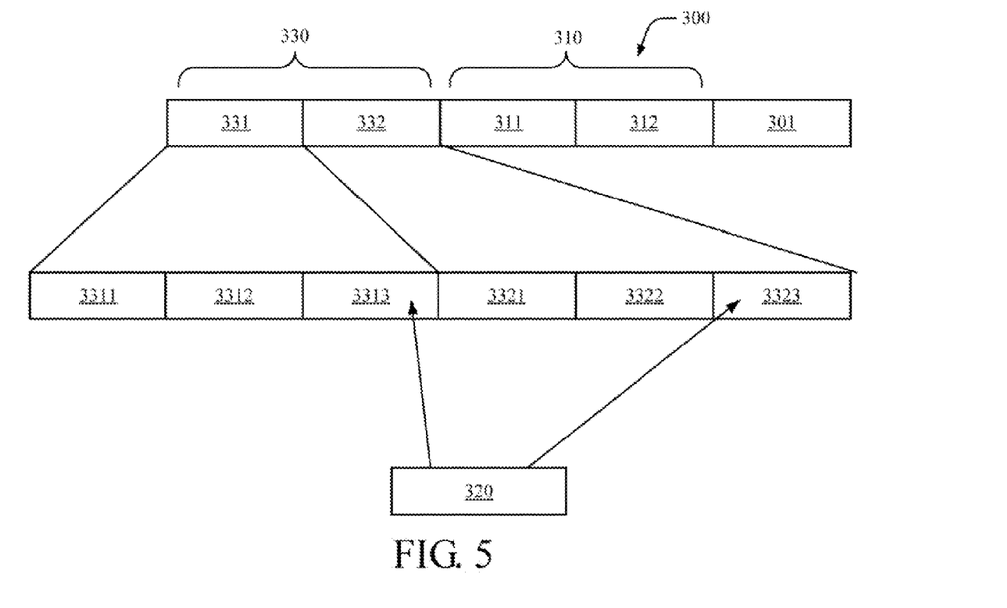
FIG. 5 is a schematic view of a packet with an IPv6 addressing header that includes two interface identifications, each of which is constituted by the mapping index of FIG. 4, in accordance with the present disclosure.

With reference to FIG. 5, the processor 151 generates a least significant segment in a second IPv6 address from the mapping index 320. For example, the processor 151 utilizes the mapping index 320 as a least significant segment in a second IPv6 address. The processor 151 encapsulates the first packet 300 with an IPv6 addressing header 330. The IPv6 header 330 comprises a source IPv6 address 331 and a destination IPv6 address 332. An IPv6 address comprises a global routing prefix, a subnet identification, and an interface identification. Accordingly, the source IPv6 address 331 comprises a global routing prefix 3311, a subnet identification 3312, and an interface identification 3313; and the destination IPv6 address 332 comprises a global routing prefix 3321, a subnet identification 3322, and an interface identification 3323. The interface identification 3313 is a least significant segment of the source IPv6 address 331, and the interface identification 3323 is a least significant segment of the destination IPv6 address 332. The mapping index 320 may constitute either or both of the interface identification 3313 and the interface identification 3323.

Packet routing in an IPv6 addressing scheme utilizes higher significant bits in an IPv6 address prior to a least significant segment in an IPv6 address. The higher significant bits constitute a more significant segment in the IPv6 address, and lower significant bits constitute the least significant segment in the IPv6 address. Therefore, the mapping index 320 may be inserted into the interface identification 3313 or 3323 without affecting routing of the first packet 300 in the IPv6 network 206.

After generating the mapping index 320, the processor 151 determines whether or not the database 165 records an index identical to the mapping index 320 (step S10). If the determination is "no," that is, no index identical to the mapping index 320 exists in the database 165, the first packet 300 is a first transmitted packet in the communication between the source IPv4 address 311 and the destination IPv4 address 312, and the processor 151 stores in the database 165 a record 410 of the mapping index 320 for the first packet 300. The communication may comprise a session, such as a session carrying VoIP packets, media streaming packets, or others. Additionally, the processor 151 generates the IPv6 header 330 of the first packet 300 utilizing the mapping index 320 and retains the IPv4 header 310 of the first packet 300, so that a network communication device, such as the network device 100B, receiving the first packet 300, maintains a correlation, such as a relationship 420, between an address in the IPv4 header 310 and the mapping index 320 (step S14).

If an index identical to the mapping index 320 exists in the database 165, the first packet 300 is not the first transmitted packet in the communication between the source IPv4 address 311 and the destination IPv4 address 312, and the processor 151 need not store a redundant record 410 of the mapping index 320 for the first packet 300 in the database 165. The communication may comprise a session, such as a session carrying VoIP packets, media streaming packets, or others. Additionally, the processor 151 generates the IPv6 header 330 of the first packet 300 from the mapping index 320 and removes the IPv4 header 310 of the first packet 300, so that a network communication device, such as the network device 100B, receiving the first packet 300, may utilize the mapping index 320 to retrieve the address in the IPv4 header 310 according to the correlation, such as the relationship 420, between an address in the IPv4 header 310 and the mapping index 320, and recover the IPv4 header 310 of the first packet 300 (step S12).

In steps S12 and S14, the IPv6 header 330 is generated as shown in FIGS. 4 and 5, such that the least significant bits of an address in the IPv6 header 330 comprise a primary key to retrieve the first IPv4 address in the IPv4 header 310 from the database 165 and the database 166.

The processor 151 transmits the first packet 300 to the IPv6 network 206 through the port 102. In the embodiment, the processor 151 of the network device 100A transmits the first packet 300 to the IPv6 network 206 through the port 102A (step S16).

Figure 6:
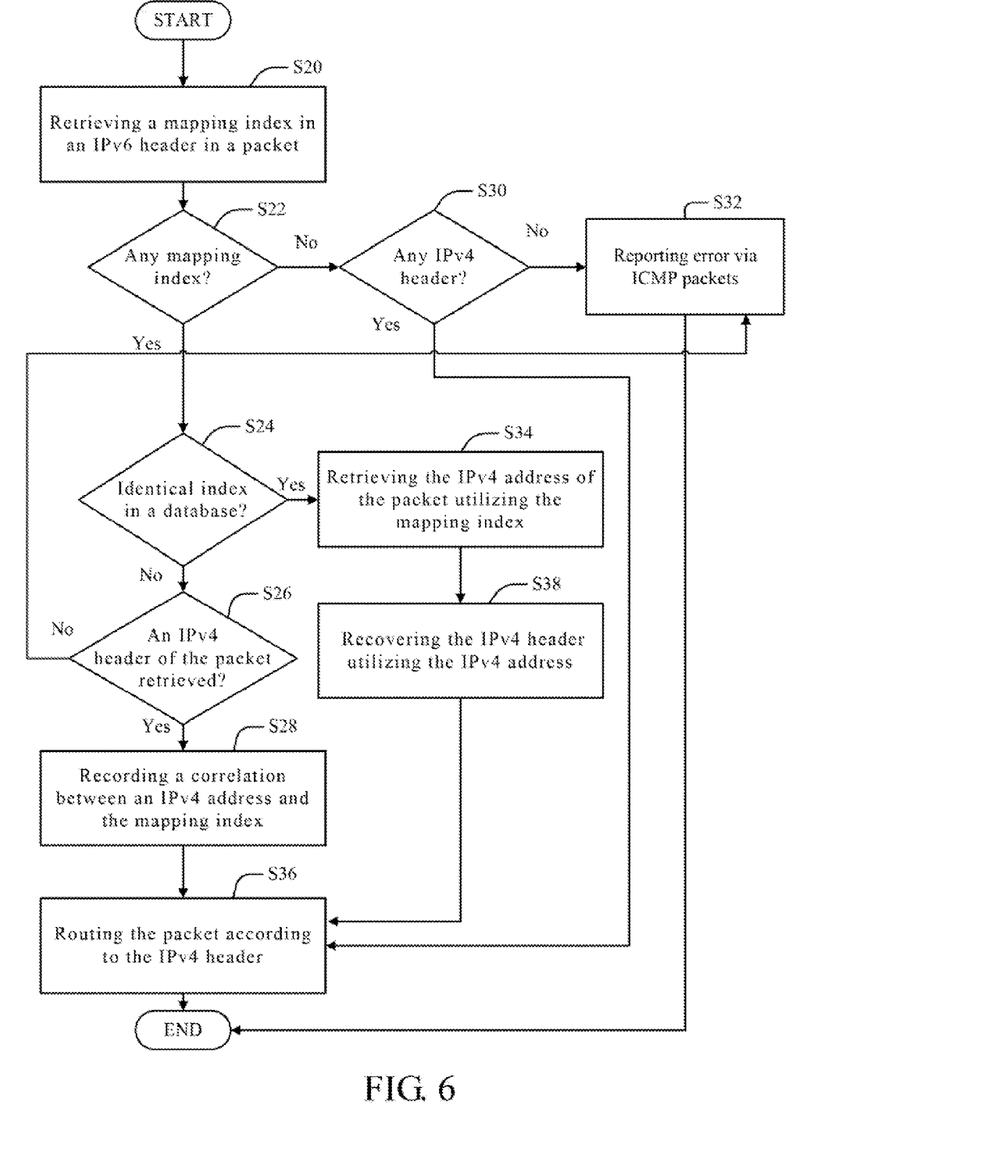
FIG. 6 is a flowchart of one embodiment of a method for restoring an IPv4 addressing header, in accordance with the present disclosure.

With reference to FIG. 6, when receiving network packets, the network communication device 100 executes a header recovery process for reducing a network addressing header. The network device 100B is given as an example of the network communication device 100 in the following description. The processor 151 of the network communication device 100 executes the steps in the following order.

When receiving the first packet 300, the network device 100B retrieves a mapping index, such as the mapping index 320, in the IPv6 header 330 of the first packet 300 (step S20). Then the network device 100B determines whether or not retrieval of such mapping index 320 is successful (step S22).

In the example of FIG. 2, if the mapping index 320 in the IPv6 header 330 is not successfully retrieved, the network device 100B determines if the first packet 300 comprises the IPv4 header 310 (step S30). If the first packet 300 comprises the IPv4 header 310, the network device 100B routes the first packet 300 according to the IPv4 header 310, and transmits the first packet 300 through the port 101B to a target device in the IPv4 network 202B (step S36). If the first packet 300 does not comprise the IPv4 header 310, the network device 100B reports an error utilizing Internet control message protocol (ICMP) packets (step S32).

If the mapping index 320 in the IPv6 header 330 is successfully retrieved, the network device 100B determines whether or not the database 166 records an index identical to the mapping index 320 (step S24). If no such index identical to the mapping index 320 exists in the database 166, the first packet 300 comprises a first transmitted packet in the communication between the source IPv4 address 311 and the destination IPv4 address 312, and the network device 100B stores in the database 166 a record of the mapping index 320 for the first packet 300. The communication may comprise a session, such as a session carrying VoIP packets, media streaming packets, or others. Additionally, the network device 100B determines whether or not the IPv4 header 310 of the first packet 300 is successfully retrieved (step S26). If the first packet 300 does not comprise the IPv4 header 310, the network device 100B reports an error utilizing Internet control message protocol (ICMP) packets (step S32). If the IPv4 header 310 of the first packet 300 is successfully retrieved, the network device 100B establishes a correlation, such as the relationship 420, between an address in the IPv4 header 310 and the mapping index 320 (step S28). Then the network device 100B routes the first packet 300 according to the IPv4 header 310, and transmits the first packet 300 through the port 101B to a target device in the IPv4 network 202B (step S36).

Additionally, the network device 100B generates the IPv6 header 330 of the first packet 300 utilizing the mapping index 320 and retains the IPv4 header 310 of the first packet 300, so that a network device, such as the network device 100A, receiving the first packet 300 establishes a correlation, such as the relationship 420, between an address in the IPv4 header 310 and the mapping index 320 (see step S14).

If an index identical to the mapping index 320 exists in the database 166, the first packet 300 is not the first transmitted packet in the communication between the source IPv4 address 311 and the destination IPv4 address 312, and the network device 100B need not store a redundant record of the mapping index 320 for the first packet 300 in the database 166. Accordingly, the processor 151 retrieves the IPv4 address of the first packet 300, which is the source IPv4 address 311 and the destination IPv4 address 312, from the database 166 according to the mapping index 320 (step S34). Then the processor 151 recovers the IPv4 header 310 of the first packet 300 utilizing the IPv4 address (step S38). Then the network device 100B routes the first packet 300 according to the IPv4 header 310, and transmits the first packet 300 through the port 101B to a target device in the IPv4 network 202B (step S36). After that, the IPv4 network device 202B routes the first packet 300 according to the IPv4 header 310.

Although utilized as an example in FIG. 6, the IPv4 header 310 and IPv4 address of the first packet 300 may be replaced by a user data protocol (UDP) header of the first packet 300.

Figure 7:
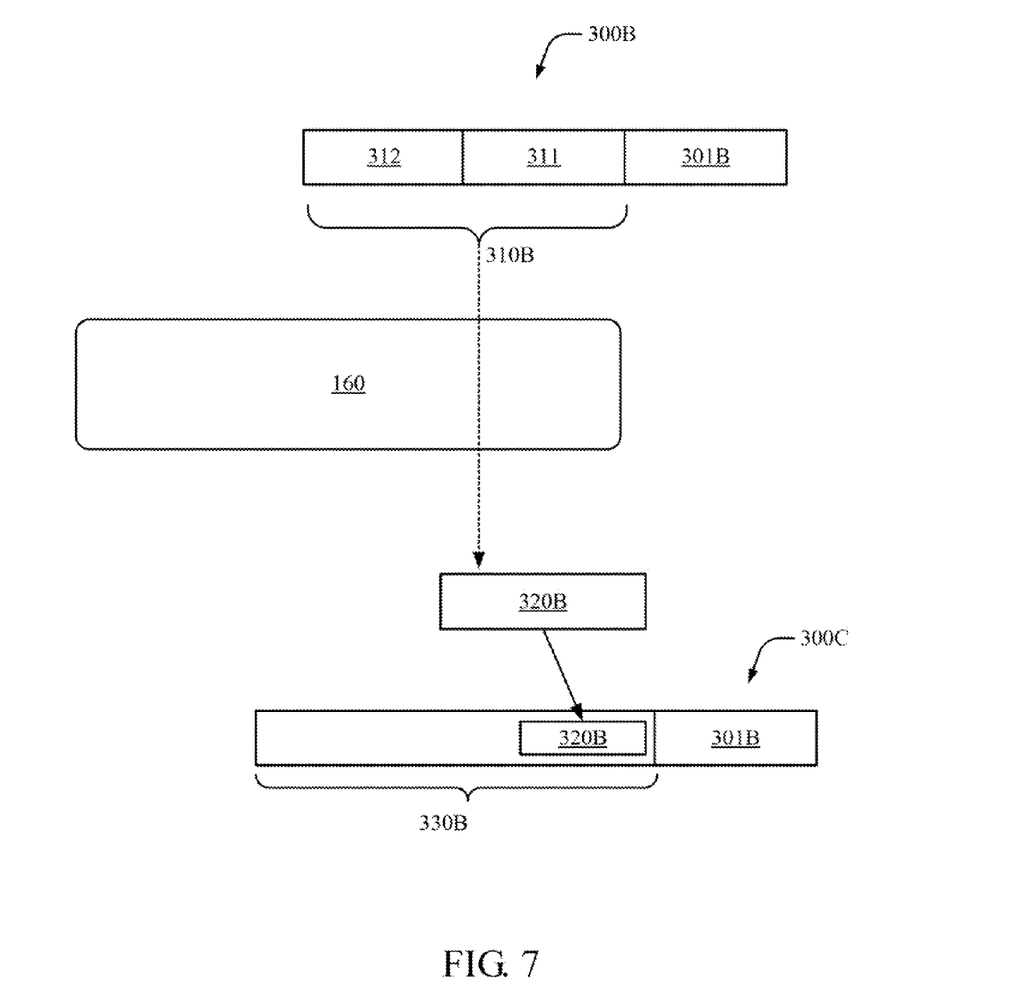
FIG. 7 is a schematic view of a packet with an IPv4 addressing header utilized to generate a corresponding modified packet with an IPv6 addressing header, in accordance with the present disclosure.

With reference to FIG. 7, if a second packet 300B with a payload 301B, a source IPv4 address 312 and a destination IPv4 address 311 is received, the network device 100B may utilize the method in FIG. 3 to process the second packet 300B and input an IPv4 addressing header 310B to the converter 160 to generate a mapping index 320B of the second packet 300B as an interface identifier of an IPv6 addressing header 330B of the second packet 300B. The network device 100B may utilize the method in FIG. 3 to process the second packet 300B and generate a modified second packet 300C from the second packet 300B. Compared to the first packet 300, the IPv4 addresses 312 and 311 have been interchanged in the second packet 300B, such that the mapping index 320B generated by the converter 160 is different from the mapping index 320. The network device 100A can not utilize the mapping index 320B to retrieve the IPv4 address of the first packet 300 and the second packet 300B. Thus, the network device 100A can generate a counter index 320A along with the mapping index 320.

With reference to FIG. 4, the network device 100A performs a swap operation 161 on the IPv4 address in the IPv4 header 310 of the first packet 300 to generate an inverted address 310A. The swap operation 161 may comprise a machine-readable program which performs the swap. The arrangement of a source address and a destination address in the IPv4 header 310 of the first packet 300 is interchanged through the swap operation 161 to be utilized as the inverted address 310A. The program for the swap operation 161 may be stored in the main memory 152 or the nonvolatile memory 153.

The network device 100A inputs the inverted address 310A to the converter 160 to generate the counter index 320A. To the extent that the inverted address 310A is identical to the IPv4 header 310B, the counter index 320A is identical to the mapping index 320B.

Figure 8:
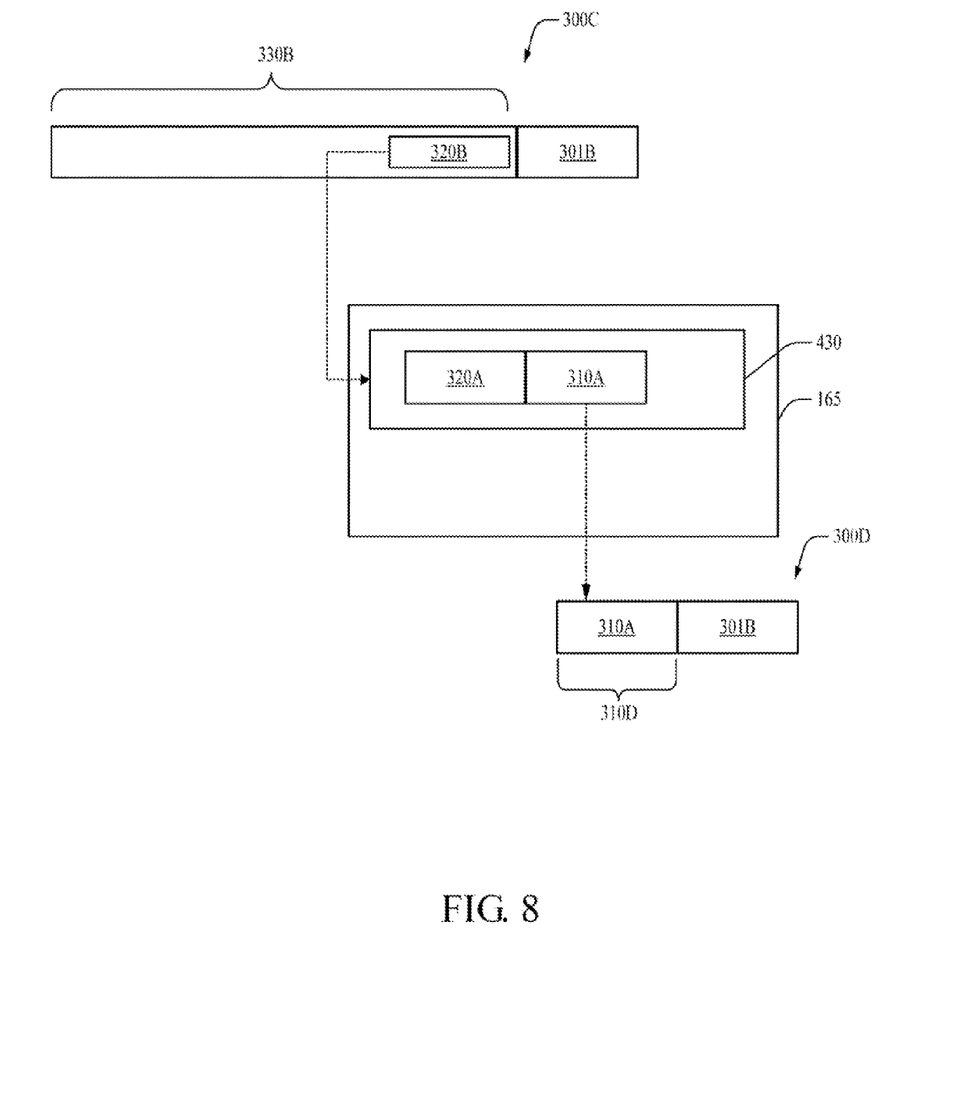
FIG. 8 is a schematic view of the modified packet of FIG. 7 utilized to generate a corresponding further modified packet with a restored IPv4 addressing header, in accordance with the present disclosure.

With reference to FIG. 8, when receiving the modified second packet 300C comprising the mapping index 320B identical to the counter index 320A, the network device 100A retrieves a record 430 from the database 165 based on the counter index 320A in the IPv6 header 330, and utilizes the record 430 to recover the inverted address 310A. The inverted address 310A constitutes an IPv4 addressing header 310D of the modified second packet 300C. In other words, the network device 100A utilizes the IPv4 header 310D having the inverted address 310A to encapsulate the modified second packet 300C and thus generate a further modified second packet 300D. The network device 100A removes the IPv6 header 330B from the further modified second packet 300D, and then transmits the further modified second packet 300D through the port 101A to the IPv4 network 202A.

In conclusion, packet routing in an IPv6 addressing scheme utilizes higher significant bits in a higher priority than the least significant segment in an IPv6 address. The higher significant bits constitute a more significant segment in the IPv6 address. Therefore, the mapping index may be inserted into the interface identification without affecting packet routing in an IPv6 network. The least significant bits of an address in an IPv6 header comprise a primary key to retrieve an IPv4 address in an IPv4 header from a database. The least significant bits of an address in the IPv6 header are thus utilized to recover an IPv4 header of a packet, such that the IPv4 header may be optionally disregarded or removed.

The foregoing disclosure of various embodiments has been presented for purposes of illustration. It is not intended to be exhaustive or to be limited to the precise forms described. Many variations and modifications of the embodiments described herein will be apparent to one of ordinary skill in the art in light of the disclosure. The scope of the disclosure is at least commensurate with the claims appended hereto and their equivalents.

What is claimed is:

1. A method for reducing a network addressing header which is executed in a network communication device, the method comprising:

retrieving a first packet for communication between a source device and a destination device across both a first communication network of a first addressing scheme and a second communication network of a second addressing scheme, wherein the first addressing scheme and second addressing scheme are different;

retrieving and converting a first address of the first packet into a mapping index under a condition that the first packet is encapsulated with a first header representing the first address conforming to the first addressing scheme;

generating a least significant segment of a second address conforming to the second addressing scheme based on the mapping index for encapsulation of the first packet with a second header representing the second address, and wherein packet routing according to the second addressing scheme utilizes a more significant segment of the second address in a higher priority than the least significant segment, and the least significant segment comprises a primary key for retrieval of the first address;

transmitting the first packet;

applying a swap operation on the first address to generate an inverted address conforming to the first addressing scheme, wherein an arrangement of a source address and a destination address in the first address is interchanged to form the inverted address;

generating a counter index based on the inverted address;

recovering the inverted address based on the counter index upon reception of a first subsequent packet comprising the counter index, wherein the counter index comprises a least significant segment of a fourth address conforming to the second addressing scheme represented by a third header of the first subsequent packet, and the inverted address comprises a third address conforming to the first addressing scheme;

encapsulating the first subsequent packet with a fourth header representing the inverted address;

removing the third header from the first subsequent packet; and transmitting the first subsequent packet.

2. The method of claim 1, wherein the first addressing scheme comprises one of Internet protocol version 4 and user datagram protocol (UDP), and the second addressing scheme comprises Internet protocol version 6, and the method further comprises:

removing the encapsulation of the first header from the first packet.

3. The method of claim 2, wherein the least significant segment comprises least significant bits in an interface identification field in an address field of the second header.

4. The method of claim 1, wherein the first subsequent packet is received from the first port of the network communication device connected to an Internet protocol version 6 (IPv6) network.

5. The method of claim 1, further comprising:

transmitting the first subsequent packet through a second port of the network communication device connected to an Internet protocol version 4 (IPv4) network.

6. The method of claim 1, wherein the first packet is transmitted through a first port of the network communication device operable to connect to an Internet protocol version 6 (IPv6) network.

7. A network communication device comprising:

a communication unit for retrieving a first packet for communication between a source device and a destination device across both a first network of a first addressing scheme and a second network of a second addressing scheme, wherein the first addressing scheme and second addressing scheme are different; and a processor connected to the communication unit and for executing a method for reducing a network addressing header, the method comprising:

retrieving and converting a first address of the first packet into a mapping index under a condition that the first packet is encapsulated with a first header representing the first address conforming to the first addressing scheme;

generating a least significant segment of a second address conforming to the second addressing scheme based on the mapping index for encapsulation of the first packet with a second header representing the second address, wherein packet routing according to the second addressing scheme utilizes a more significant segment of the second address other than the least significant segment, and the least significant segment comprises a primary key for retrieval of the first address;

transmitting the first packet;

applying a swap operation on the first address to generate an inverted address conforming to the first addressing scheme, wherein an arrangement of a source address and a destination address in the first address is exchanged to form the inverted address:

generating a counter index based on the inverted address;

recovering the inverted address based on the counter index upon reception of a first subsequent packet comprising the counter index, wherein the counter index comprises a least significant segment of a fourth address conforming to the second addressing scheme represented by a third header of the first subsequent packet, and the inverted address comprises a third address conforming to the first addressing scheme:

encapsulating the first subsequent packet with a fourth header representing the inverted address;

removing the third header from the first subsequent packet; and transmitting the first subsequent packet.

8. The network communication device of claim 7, wherein the first addressing scheme comprises one of Internet protocol version 4 and user datagram protocol (UDP), the second addressing scheme comprises Internet protocol version 6, and the method further comprises:

removing the encapsulation of the first header from the first packet.

9. The network communication device of claim 8, wherein the least significant segment comprises least significant bits in an interface identification field in an address field of the second header.

10. The network communication device of claim 7, wherein the first subsequent packet is received from the first port of the network communication device connected to an Internet protocol version 6 (IPv6) network.

11. The network communication device of claim 7, wherein the method further comprises:

transmitting the first subsequent packet through a second port of the network communication device connected to an Internet protocol version 4 (IPv4) network.

12. The network communication device of claim 7, wherein the first packet is transmitted through a first port of the network communication device operable to connect to an Internet protocol version 6 (IPv6) network.

13. A network communication system comprising:

a first network communication device for retrieving a first packet for communication between a source device and a destination device across both a first network of a first addressing scheme and a second network of a second addressing scheme, wherein the first addressing scheme and second addressing scheme are different, and for executing a method for reducing a network addressing header, the method comprising:

retrieving and converting a first address of the first packet into a mapping index under a condition that the first packet is encapsulated with a first header representing the first address conforming to the first addressing scheme;

generating a least significant segment of a second address conforming to the second addressing scheme based on the mapping index for encapsulation of the first packet with a second header representing the second address, wherein packet routing according to the second addressing scheme utilizes a more significant segment of the second address other than the least significant segment, and the least significant segment comprises a primary key for retrieval of the first address;

transmitting the first packet;

applying a swap operation on the first address to generate an inverted address conforming to the first addressing scheme, arrangement of a source address and a destination address in the first address is exchanged to form the inverted address, and the inverted address comprises a third address conforming to the first addressing scheme;

generating a counter index based on the inverted address;

recovering the inverted address based on the counter index upon reception of a first subsequent packet comprising the counter index, wherein the counter index comprises a least significant segment of a fourth address conforming to the second addressing scheme represented by a third header of the first subsequent packet;

encapsulating the first subsequent packet with a fourth header representing the inverted address;

removing the third header from the first subsequent packet; and transmitting the first subsequent packet.

14. The network communication system of claim 13, wherein the first addressing scheme comprises one of Internet protocol version 4 and user datagram protocol (UDP), and the second addressing scheme comprises Internet protocol version 6, and the method further comprises:

removing the encapsulation of the first header from the first packet.

15. The network communication system of claim 14, wherein the least significant segment comprises least significant bits in an interface identification field in address field of the second header.

16. The network communication system of claim 13, further comprising:

a second communication device for executing an addressing header recovery method, wherein the addressing header recovery method further comprises:

utilizing the least significant segment in the second address as the primary key to store an association relationship between the first address and the least significant segment in a database.

17. The network communication system of claim 16, wherein the addressing header recovery method further comprises:

utilizing the least significant segment in the second address as the primary key to locate the first address in a database if the first header has been removed from the first packet; and recovering the first header of the first packet utilizing the first address.

18. The network communication system of claim 13, wherein the method further comprises:

transmitting the first subsequent packet through a port of the network communication system connected to an Internet protocol version 4 network.

19. A method for reducing a network addressing header which is executed in a network communication device, the method comprising:
- retrieving a first packet for communication between a source device and a destination device across both a first communication network of a first addressing scheme and a second communication network of a second addressing scheme, wherein the first addressing scheme and second addressing scheme are different;
- retrieving a first address of the first packet under a condition that the first packet is encapsulated with a first header representing the first address conforming to the first addressing scheme;
- applying a swap operation on the first address to generate an inverted address conforming to the first addressing scheme, wherein an arrangement of a source address and a destination address in the first address is interchanged to form the inverted address;
- generating a counter index based on the inverted address;
- recovering the inverted address based on the counter index upon reception of a first subsequent packet comprising the counter index, wherein the counter index comprises a least significant segment of a fourth address conforming to the second addressing scheme represented by a third header of the first subsequent packet, and the inverted address comprises a third address conforming to the first addressing scheme;
- encapsulating the first subsequent packet with a fourth header representing the inverted address;
- removing the third header from the first subsequent packet; and
- transmitting the first subsequent packet.

* * * * *